US012262377B2

(12) United States Patent
Liang et al.

(10) Patent No.: US 12,262,377 B2
(45) Date of Patent: Mar. 25, 2025

(54) METHOD, DEVICE AND COMPUTER READABLE MEDIUM FOR HYBRID AUTOMATIC REPEAT REQUEST FEEDBACK

(71) Applicant: NEC CORPORATION, Tokyo (JP)

(72) Inventors: Lin Liang, Beijing (CN); Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 329 days.

(21) Appl. No.: 17/619,532

(22) PCT Filed: Jun. 17, 2019

(86) PCT No.: PCT/CN2019/091591
§ 371 (c)(1),
(2) Date: Dec. 15, 2021

(87) PCT Pub. No.: WO2020/252640
PCT Pub. Date: Dec. 24, 2020

(65) Prior Publication Data
US 2022/0232602 A1 Jul. 21, 2022

(51) Int. Cl.
*H04W 72/1273* (2023.01)
*H04L 1/08* (2006.01)
(Continued)

(52) U.S. Cl.
CPC ........... *H04W 72/1273* (2013.01); *H04L 1/08* (2013.01); *H04L 1/1812* (2013.01); *H04L 5/0053* (2013.01); *H04W 72/20* (2023.01)

(58) Field of Classification Search
CPC . H04W 72/1273; H04W 74/04; H04W 72/20; H04L 1/08; H04L 1/18;
(Continued)

(56) References Cited

U.S. PATENT DOCUMENTS

2014/0086285 A1 3/2014 Yang et al.
2019/0103943 A1 4/2019 Wang et al.
(Continued)

FOREIGN PATENT DOCUMENTS

CN 107294665 A 10/2017
CN 108141322 A 6/2018
(Continued)

OTHER PUBLICATIONS

"Scheduling/HARQ enhancements for NR-U", Fujitsu, 3GPP TSG RAN WG1 #97, R1 1906434, May 13-17, 2019, pp. 1-6.
(Continued)

*Primary Examiner* — Mohamed A Kamara
(74) *Attorney, Agent, or Firm* — Sughrue Mion, PLLC

(57) ABSTRACT

Embodiments of the present disclosure relate to method, device and computer readable medium for hybrid automatic repeat request (HARQ) feedback. The method comprises receiving, from a network device, first control information at least comprising first channel indices for a first group of data channels and second channel indices for a second group of data channels, the first group of the data channels being at least part of a first set of data channels scheduled for data transmission from the network device to the terminal device and the second group of the data channels being at least part of a second set of data channels scheduled for the data transmission. The method also comprises generating, based on the first control information, feedback information indicating first reception states of data on the first group of data channels in association with the first channel indices and second reception states of data on the second group of data channels in association with the second channel indices. The method further comprises transmitting the feedback information via an uplink channel to the network device. In this way, for the case that the HARQ ACK/NACK feedback
(Continued)

related to multiple PDSCH groups in a same PUCCH, the miss detection of DCI in multiple PDSCH groups may reflect in the bit sequence for the HARQ ACK/NACK feedback, so that the network device may be aware of the miss detection and determine the data to be retransmitted.

3 Claims, 3 Drawing Sheets

(51) Int. Cl.
*H04L 1/1812* (2023.01)
*H04L 5/00* (2006.01)
*H04W 72/20* (2023.01)

(58) Field of Classification Search
CPC ... H04L 1/1812; H04L 5/0053; H04L 1/1628; H04L 1/1829; H04L 5/001; H04L 5/005; H04L 5/0094
See application file for complete search history.

(56) References Cited

U.S. PATENT DOCUMENTS

| | | | | |
|---|---|---|---|---|
| 2020/0228289 | A1* | 7/2020 | He | H04L 1/1861 |
| 2021/0329682 | A1* | 10/2021 | Takeda | H04W 72/0446 |
| 2021/0352704 | A1* | 11/2021 | Yang | H04L 5/0053 |
| 2022/0124760 | A1* | 4/2022 | Yang | H04W 72/20 |
| 2022/0217756 | A1* | 7/2022 | Wu | H04L 1/1861 |

FOREIGN PATENT DOCUMENTS

| | | |
|---|---|---|
| JP | 2018-516485 A | 6/2018 |
| WO | 2012/118356 A2 | 9/2012 |
| WO | 2014/017503 A1 | 1/2014 |

OTHER PUBLICATIONS

"HARQ enhancements for NR-U", Samsung, 3GPP TSG RAN WG1 #97, R1 1906922, May 13-17, 2019, pp. 1-7.
"Discussions on HARQ enhancements in NR-U" CAICT, 3GPP TSG RAN WG1 #97, R1 1907200, May 13-17, 2019, pp. 1-3.
International Search Report for PCT/CN2019/091591 dated Mar. 20, 2020 [PCT/ISA/210].
Written Opinion for PCT/CN2019/091591 dated Mar. 20, 2020 [PCT/ISA/237].
Samsung, "Discussion on HARQ process group based HARQ-ACK feedback", 3GPP TSG RAN WG1 #97, R1-1906926, Reno, USA, May 13-17, 2019 (4 pages).
Chinese Office Action dated Jul. 5, 2023 in Application No. 2019800097537.5.
Japanese Office Action dated Aug. 15, 2023 in Application No. 2021-575210.
Communication dated Dec. 3, 2024 issued by the Japanese Patent Office in application No. 2024-053360.
Ericsson, "HARQ and scheduling enhancements for NR-U", 3GPP TSG-RAN WG1 Meeting #97, Reno, NV, USA, May 13-17, 2019, R1-1907456, pp. 2-15 (15 pages total).
LG Electronics, "HARQ procedure for NR-U", 3GPP TSG RAN WG1 #97, Reno, USA, May 13-17, 2019, R1-1906677, 17 pages total.
Huawei, "Feature lead summary of HARQ enhancements for NR-U", 3GPP TSG RAN WG1 Meeting #96bis, Xi'an, China, Apr. 8-12, 2019, R1-1905649, pp. 1-29.
MediaTek, Inc., "Enhancements to HARQ for NR-U operation", 3GPP TSG RAN WG1 #96bis, Xi'an, China, Apr. 8-12, 2019, R1-1904484, 12 pages total.
Intel Corporation, "Enhancements to HARQ for NR-unlicensed", 3GPP TSG RAN WG1 Meeting #97, Reno, USA, May 13-17, 2019, R1-1906787, 13 pages total.

* cited by examiner

METHOD, DEVICE AND COMPUTER READABLE MEDIUM FOR HYBRID AUTOMATIC REPEAT REQUEST FEEDBACK

CROSS REFERENCE TO RELATED APPLICATIONS

This application is a National Stage of International Application No. PCT/CN2019/091591 filed Jun. 17, 2019.

TECHNICAL FIELD

Embodiments of the present disclosure generally relate to the field of communication, and in particular, to method, device and computer readable medium for hybrid automatic repeat request (HARQ) feedback.

BACKGROUND

Communication technologies have been developed in various communication standards to provide a common protocol that enables different wireless devices to communicate on a municipal, national, regional, and even global level. An example of an emerging communication standard is new radio (NR), for example, 5G radio access. NR is a set of enhancements to the Long Term Evolution (LTE) mobile standard promulgated by Third Generation Partnership Project (3GPP).

To improve transmission reliability, a HARQ mechanism has been widely used in communication systems. In HARQ, a receiver feeds back a positive acknowledgement (ACK) to a transmitter if data from the transmitter is detected correctly and a negative acknowledgement (NACK) if the data is not correctly detected. Then the transmitter performs a new transmission or a retransmission depending on whether an ACK or NACK is received from the receiver. Therefore, ACK/NACK feedback (which may also be referred to as HARQ feedback) is important for data transmission scheduling.

SUMMARY

In general, example embodiments of the present disclosure provide method, device and computer readable medium for HARQ feedback.

In a first aspect, there is provided a method implemented at a terminal device. The method comprises receiving, from a network device, first control information at least comprising first channel indices for a first group of data channels and second channel indices for a second group of data channels, the first group of the data channels being at least part of a first set of data channels scheduled for data transmission from the network device to the terminal device and the second group of the data channels being at least part of a second set of data channels scheduled for the data transmission. The method also comprises generating, based on the first control information, feedback information indicating first reception states of data on the first group of data channels in association with the first channel indices and second reception states of data on the second group of data channels in association with the second channel indices. The method further comprises transmitting the feedback information via a uplink channel to the network device.

In a second aspect, there is provided a method implemented at a network device. The method comprises transmitting, to a terminal device, second control information associated with a first set of data channels scheduled for data transmission from the network device to the terminal device and a second set of data channels scheduled for the data transmission. The method further comprises receiving feedback information indicating first reception states of data on a first group of data channels in association with a first channel indices for the first group of data channels and second reception states of data on a second group of data channels in association with a second channel indices for the second group of data channels, the first group of the data channels being at least part of a first set of data channels and the second group of the data channels being at least part of a second set of data channels. The method also comprises determining data to be retransmitted based on the second control information and the feedback information.

In a third aspect, there is provided a terminal device. The terminal device comprises a processor; and a memory coupled to the processing unit and storing instructions thereon, the instructions, when executed by the processing unit, causing the device to perform actions according to the first aspect.

In a fourth aspect, there is provided a network device. The network device comprises a processor; and a memory coupled to the processing unit and storing instructions thereon, the instructions, when executed by the processing unit, causing the device to perform actions of according to the second aspect.

In the fifth aspect, there is provided a computer readable medium having instructions stored thereon, the instructions, when executed on at least one processor, causing the at least one processor to carry out the method according to the first aspect.

In the sixth aspect, there is provided a computer readable medium having instructions stored thereon, the instructions, when executed on at least one processor, causing the at least one processor to carry out the method according to the second aspect.

Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein.

DETAILED DESCRIPTION

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "network device" or "base station" (BS) refers to a device which is capable of providing or hosting a cell or coverage where terminal devices can communicate. Examples of a network device include, but not limited to, a Node B (NodeB or NB), an Evolved NodeB (eNodeB or eNB), a NodeB in new radio access (gNB) a Remote Radio Unit (RRU), a radio head (RH), a remote radio head (RRH), a low power node such as a femto node, a pico node, and the like. For the purpose of discussion, in the following, some embodiments will be described with reference to gNB as examples of the network device.

As used herein, the term "terminal device" refers to any device having wireless or wired communication capabilities. Examples of the terminal device include, but not limited to, user equipment (UE), personal computers, desktops, mobile phones, cellular phones, smart phones, personal digital assistants (PDAs), portable computers, image capture devices such as digital cameras, gaming devices, music storage and playback appliances, or Internet appliances enabling wireless or wired Internet access and browsing and the like.

As used herein, the singular forms "a", "an" and "the" are intended to include the plural forms as well, unless the context clearly indicates otherwise. The term "includes" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be included below.

In some examples, values, procedures, or apparatus are referred to as "best," "lowest," "highest," "minimum," "maximum," or the like. It will be appreciated that such descriptions are intended to indicate that a selection among many used functional alternatives can be made, and such selections need not be better, smaller, higher, or otherwise preferable to other selections.

Figure 1:
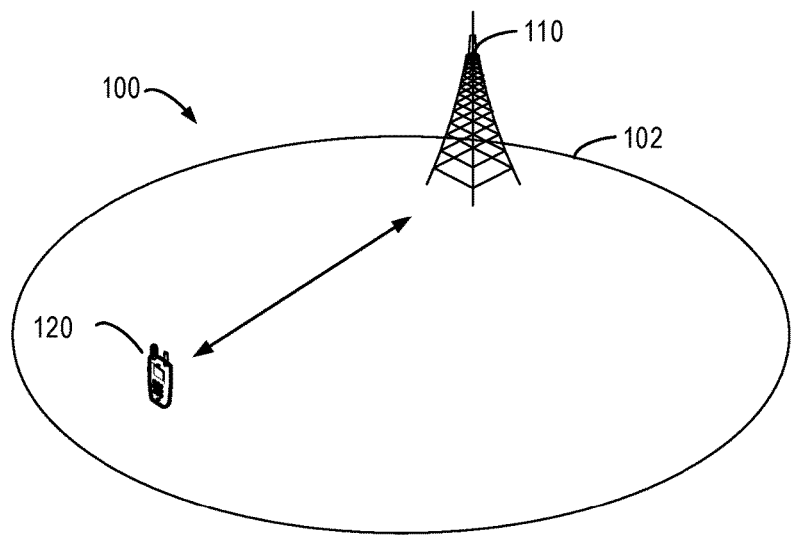
FIG. 1 is a schematic diagram of a communication environment in which some embodiments according to the present disclosure can be implemented.

FIG. 1 shows an example communication network 100 in which embodiments of the present disclosure can be implemented. The network 100 includes a network device 110, a terminal device 120 served by the network device 110. The serving area of the network device 110 is called as a cell 102. It is to be understood that the number of network devices and terminal devices is only for the purpose of illustration without suggesting any limitations. The network 100 may include any suitable number of network devices and terminal devices adapted for implementing embodiments of the present disclosure. Although not shown, it would be appreciated that one or more terminal devices may be in the cell 102 and served by the network device 110.

In the communication network 100, the network device 110 can communicate data and control information to the terminal device 120 and the terminal device 120 can also communication data and control information to the network device 110. A link from the network device 110 to the terminal device 120 is referred to as a downlink (DL) or a forward link, while a link from the terminal device 120 to the network device 110 is referred to as an uplink (UL) or a reverse link.

Depending on the communication technologies, the network 100 may be a Code Division Multiple Access (CDMA) network, a Time Division Multiple Address (TDMA) network, a Frequency Division Multiple Access (FDMA) network, an Orthogonal Frequency-Division Multiple Access (OFDMA) network, a Single Carrier-Frequency Division Multiple Access (SC-FDMA) network or any others. Communications discussed in the network 100 may use conform to any suitable standards including, but not limited to, New Radio Access (NR), Long Term Evolution (LTE), LTE-Evolution, LTE-Advanced (LTE-A), Wideband Code Division Multiple Access (WCDMA), Code Division Multiple Access (CDMA), cdma2000, and Global System for Mobile Communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols. The techniques described herein may be used for the wireless networks and radio technologies mentioned above as well as other wireless networks and radio technologies. For clarity, certain aspects of the techniques are described below for LTE, and LTE terminology is used in much of the description below.

As described above, a HARQ mechanism has been widely used in communication systems, to improve transmission reliability. In a HARQ process, a receiver feeds back a positive acknowledgement (ACK) to a transmitter if data from the transmitter is detected correctly and a negative acknowledgement (NACK if the data is not correctly detected. Then the transmitter performs a new transmission or a retransmission depending on whether an ACK or NACK is received from the receiver. Therefore, ACK/NACK feedback (which may also be referred to as HARQ feedback) is important for data transmission scheduling.

As shown in FIG. 1, the network device 110 may transmit downlink control information (DCI) via a Physical Downlink Control Channel (PDCCH) to the terminal device 120. The DCI may indicate a resource for transmitting data from the network device 110 to the terminal device 120, to enable the terminal device 120 to receive data via a Physical Downlink Shared Channel (PDSCH) between the terminal device 120 and the network device 110. Further, the DCI may also comprising configuration of HARQ feedback for the terminal device 120, to indicate resource and behavior for transmitting HARQ feedback.

Errors in the HARQ mechanism may cause failure of ACK/NACK feedback or detection, and as a result, the transmitter is unaware of whether data has been received correctly or not.

It has been observed that due to path loss, channel fading and/or interference, error may occur during data transmission or HARQ feedback, resulting DL miss detection in the HARQ mechanism.

If a DCI is transmitted by a transmitter but not detected by a receiver, DCI miss detection occurs. In such a case, an ACK/NACK feedback is expected by the transmitter but will not be provided by the receiver, causing ambiguity at the transmitter and the receiver sides. Even though the DCI carried in a physical downlink control channel (PDCCH) has high decoding accuracy, it still has a typical decoding error rate of about 1%, which means that miss detect of the DCI cannot be avoided completely.

For HARQ feedback with multiple occasions multiplexing (i.e., feedback for multiple PDSCH transmissions), a downlink assignment index (DAI) may be included in a DCI to solve the problem caused by DCI miss detection, except for DCI miss detection of last one or more transmission occasions. Based on the DAI field in the DCI, the terminal device 120 becomes aware of a PDCCH which is miss-detected. This ensures that the terminal device 120 has the same knowledge on length of HARQ-ACK bits to be fed back as the network device 110, even though miss detection may happen. For example, with a 2-bits DAI, there will be ambiguity in the size of the feedback (i.e., number of the feedback bits), only when 4 continuous DCIs are missed.

It was proposed the dynamic HARQ codebook in some agreement to support the HARQ feedback. With dynamic codebook for HARQ feedback, only transmitted PDSCHs are considered when generating HARQ bits, to reduce payload size. In such cases, the terminal device 120 only transmit a HARQ feedback if a DCI is detected, and the content of the feedback, i.e., ACK or NACK, depends on whether PDSCH scheduled by the detected DCI is decoded correctly or not. Therefore, if a DCI is transmitted by the transmitter but not detected by the receiver (i.e., DCI miss detection occurs), an ACK/NACK will not be transmitted, and it may cause ambiguity at the transmitter and the receiver side.

For operation with dynamic HARQ codebook, PDSCH may be grouped by explicitly signaling a group index in DCI scheduling the PDSCH in some cases such as NR operation on unlicensed band or NR transmission with multiple panel. For example, the maximum number of PDSCH groups is 2. Alternatively, the maximum number of PDSCH groups may also be 4. The number of HARQ-ACK bits for one PDSCH group may change between successive requests for HARQ-ACK feedback for the same PDSCH group. HARQ-ACK feedback for all PDSCHs in the same group is carried in the same Physical Uplink Control Channel (PUCCH). HARQ-ACK feedbacks for one or more PDSCH groups can also be carried in the same PUCCH. Furthermore, a counter DAI (C-DAT) and a Total DAI (T-DAI) may be accumulated only within each PDSCH group. The ACK-Feedback Group Indicator for each PDSCH Group may operate as a toggle bit.

In current NR systems, problems caused by miss detection of last one or more transmission occasions may be solved by the C-DAI and/or the T-DAI included in each DCI, where the C-DAI in a DCI indicates the total number of DCIs that have been transmitted in a PDSCH group (i.e., a group of PDSCH associated with same PUCCH feedback occasion) till current PDSCH, the T-DAI in the DCI indicates the total number of DCIs to be transmitted in a PDSCH group till current time instance when carrier aggregation is adopted. The T-DAI in carrier aggregation can help to solve a problem caused by miss detection of last one or more transmission occasions. However, there is no T-DAI is not present for single carrier deployment.

If there are more PDSCH groups (for example two PDSCH groups) in one PUCCH which is different from current NR systems as only one PDSCH group in one PUCCH, and for a nature encoding order (HARQ-ACK bits of the second group follow the first ones), the miss detection of the last PDCCH of the first group will cause HARQ-ACK bit shift at encoder. The network device 110 may not be aware of this shifted HARQ-ACK bit and NACK to ACK issue could happen which is more serious than single PDSCH group.

Figure 2:
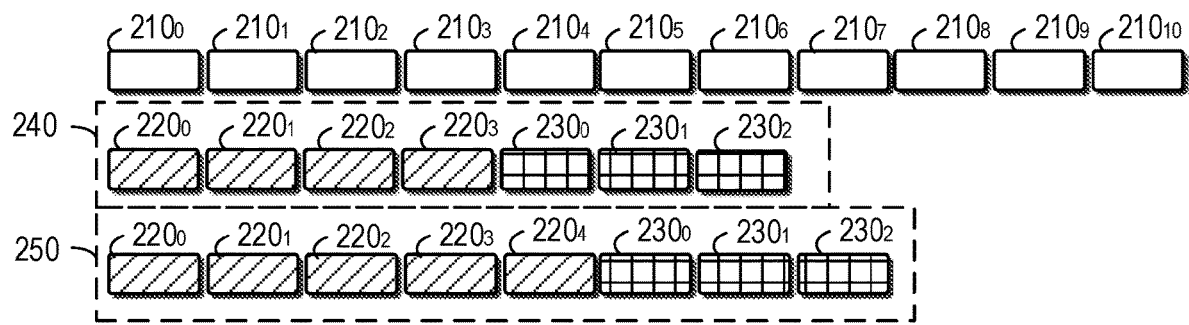
FIG. 2 shows a schematic diagram illustrating an example of miss detection in accordance with some embodiments of the present disclosure.

FIG. 2 shows a schematic diagram illustrating an example of miss detection. 11 bits RM-encoder may be shown by blocks $210_0$-$210_{10}$, which indicated a coding format for a bit sequence of the feedback information to be generated by the terminal device 120. If there are two PDSCH groups, in which the PDSCH group 1 includes 5 PDSCH channels and the PDSCH group 2 includes 3 PDSCH channels, the network device 110 may except to receive a HARQ ACK/NACK feedback in 8 bits, which may be shown by a bit sequence 250 in FIG. 2. The bit sequence 250 may include 5 bits HARQ ACK/NACK feedback (represented by block $220_0$-$220_4$) for PDSCH group 1 and 3 bits HARQ ACK/NACK feedback for PDSCH group 2 (represented by block $230_0$-$230_2$).

However, if the terminal device 120 miss the last PDSCH channel of the PDSCH group 1, in other words, the terminal device 120 may not be aware of the last PDSCH channel of the PDSCH group 1, the terminal device may only fed 4 bits HARQ ACK/NACK back (represented by block $220_0$-$220_3$) for the PDSCH group 1 in bit sequence 240. According to the nature encoding order, 3 bits HARQ ACK/NACK back (represented by block $230_0$-$230_2$) for the PDSCH group 2 in bit sequence 240 may follow the 4 bits HARQ ACK/NACK for the PDSCH group 1.

Compared with the bit sequence 250, it can be seen that the HARQ ACK/NACK for the PDSCH group 2 in the bit sequence 240 may be shifted forward one bit. The network device 110 may not be aware of this shifted HARQ-ACK bit and NACK to ACK issue could happen which is more serious than that of a single PDSCH group. That is, 1% probability of miss detection of the last PDCCH of the first group may cause NACK to ACK error, which may push NACK to ACK error far beyond the work point (0.1%). This situation is not accepted.

In order to address the miss detection issue, an embodiment of the present disclosure proposes a method for HARQ ACK/NACK feedback. Some information for indicating the channel indices within each PDSCH group or the channel indices of channels in all of the PDSCH groups may be introduced into the downlink control information. These information may help the network device 110 aware of the miss detection of PDSCH at the terminal device 120 based on the HARQ ACK/NACK feedback from the terminal device 120.

Principle and example embodiments will now be described in detail below with reference to the accompanying drawings. However, those skilled in the art would readily appreciate that the detailed description given herein with respect to these drawings is for explanatory purpose as the present disclosure extends beyond theses limited embodiments.

Figure 3:
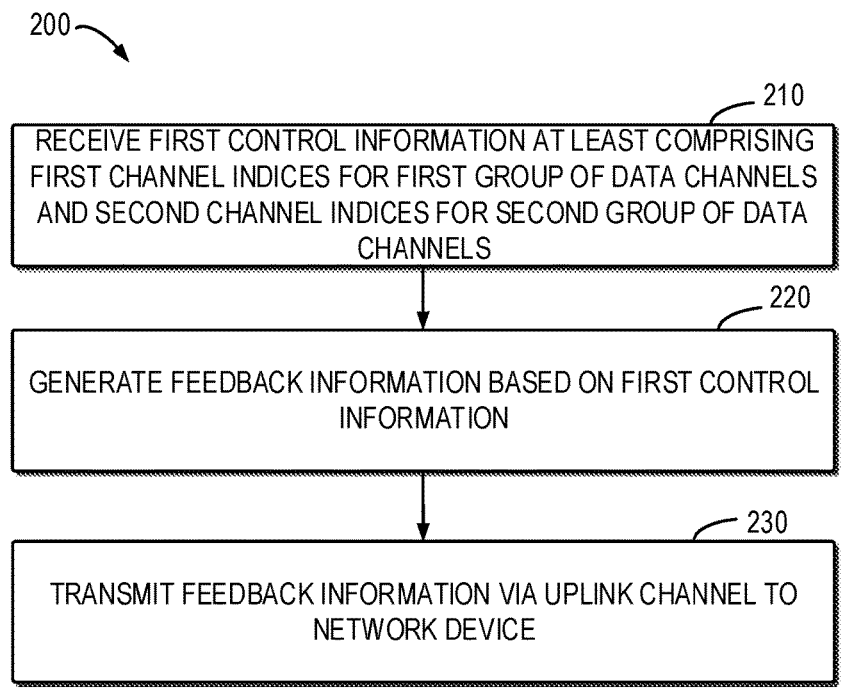
FIG. 3 illustrates a flowchart of an example method in accordance with some embodiments of the present disclosure.

FIG. 3 illustrates a flowchart of an example method 300 in accordance with some embodiments of the present disclosure. The method 300 can be implemented at the terminal device 120 shown in FIG. 1. It is to be understood that the method 300 may include additional blocks not shown and/or may omit some blocks as shown, and the scope of the present disclosure is not limited in this regard. For the purpose of discussion, the method 300 will be described with reference to FIG. 1.

As shown in FIG. 3, at block 310, the terminal device 120 receives control information from the network device 110. The control information may involve two data channel groups, i.e. a first group of data channels and a second group of data channels. As mentioned above, the terminal device 120 may miss part of control information actually transmitted from the network device 110 but may not aware of that. The control information received by the terminal device 120 may be referred to the first control information hereafter, which may at least comprises first channel indices for data channels in the first group of data channels and second channel indices for the second group of data channels.

The control information transmitted from the network device 110 may be referred to the second control information hereafter which may involve a first set of data channels and a second set of data channels that have been scheduled for data transmission from the network device to the terminal device by the network device 110. It should be understood that the first group of the data channels may be at least part of a first set of data channels and the second group of the data channels may be at least part of a second set of data channels if one or more PDSCH in the first set of data channels and the second set of data channels may not be detected at the terminal device 120.

As the example shown in FIG. 2, the network device may transmit the second control information involving the first set of data channels including 5 data channels and the second set of data channels including 3 data channels. However, the last PDSCH in the first set of data channels is missed. Thus, the first control information received by the terminal device may involve part of the first set of data channels and all of the second set of data channels. In this case, the first group of data channels may refer to the part of the first set of data channels and the second group of data channels may refer to all of the second set of data channels.

At block 320, the terminal device 120 generates the feedback information based on the first control information. The feedback information may indicate the first and second group of the data channels involved in the first control information received by the terminal device. In some example embodiments, the feedback information may be generated in association with the first channel indices and the second channel indices.

Figure 4:
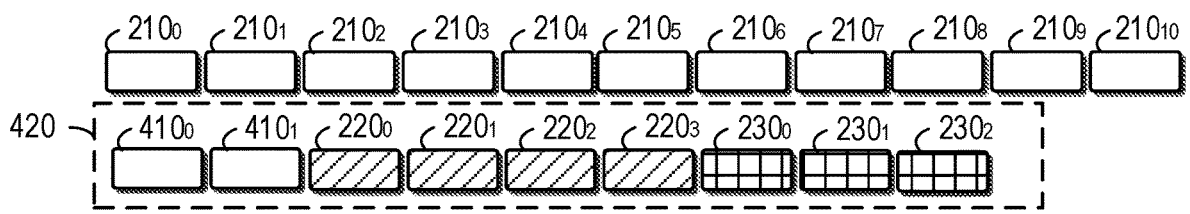
FIG. 4 shows a schematic diagram illustrating an example of feedback information according to some embodiments of the present disclosure.
Figure 5:
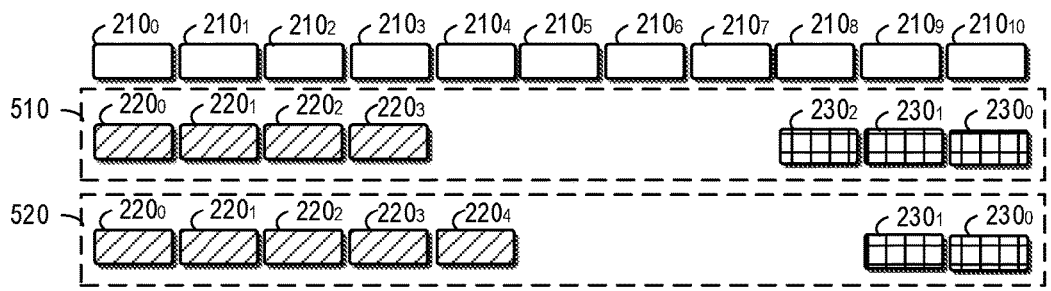
FIG. 5 shows a schematic diagram illustrating another example of feedback information according to some other embodiments of the present disclosure.

Now reference is made to FIGS. 4-5, which show some example of feedback information.

In some example embodiments, the terminal device 120 may determine the index of the last channel in the received first group of data channels based on the first channel indices. The terminal device 120 may generate a bit sequence the determined index of the last data channel, the first reception states and the second reception states. In the generated bit sequence, the bit part indicating the index of the last channel may precede the bit part indicating the first reception states and the second reception states.

As shown in FIG. 4, 11 bits RM-encoder may be shown by blocks $210_0$-$210_{10}$, which indicated a coding format for a bit sequence of the feedback information to be generated by the terminal device 120. A bit sequence 420 is generated for HARQ ACK/NACK feedback. In the beginning of bit sequence 420, there are 2 bits (block $410_0$ and $410_1$) for indicating the index of the last data channel. The other bits indicating the first reception states and the second reception states may follow these 2 bits in a nature encoding order.

Thus, when the feedback information is received by the network device 110, the network device 110 may at first determine whether the last data channel of the first set of data channels, which has been scheduled for data transmission, is missed by the terminal device. If the network device 110 determines that the last data channel is missed, the network device 110 may retransmit data on this data channel at next transmission occasion.

In some example embodiments, the terminal device 120 may also determine the total number of data channels in the first group of data channels based on the first channel indices and generates a bit sequence indicating the total number, the first reception states and the second reception states. Similar with the index of the last data channel in the first group of data channels, the bit part indicating total number of data channels in the first group of data channels may precede the bit part indicating the first reception states and the second reception states.

Likewise, the bit sequence indicating the total number, the first reception states and the second reception states may also refer to the bit sequence 420 of FIG. 4, there are 2 bits (block $410_0$ and $410_1$) for indicating the index of the total number of data channels in the beginning of the sequence. The other bits indicating the first reception states and the second reception states may follow these 2 bits in a nature encoding order.

If there are more than 2 groups of data channel, it should be understood that some bits for indicating the index of the channel of the second group or the total number of channel in the second group may also be introduced into the bit sequence 420.

As mentioned above, the terminal device 120 may transmit some information at first for the network device 110 to decide whether the last PDCCH of the first PDSCH group is miss-detected. When more than 2 PDSCH groups is allowed, the information of previous PDSCH groups before the last group can be ordered first as a simple extension. The presence of information field can be configured by RRC explicitly. It also can be implicit to add based on some configuration, e.g., by maxPdschGroupsNum>1 and servingCellNum==1.

In some example embodiments, for HARQ-ACK feedback on PUSCH and/or bit length is larger than 11, the polar code may be adopted for encoding, which allows much more bit length that the RM code.

In some example embodiments, the terminal device 120 may generate a bit sequence for HARQ ACK/NACK feedback with a changed encoding order. That is to say, the first reception states and the second reception states may not be encoded in the nature encoding order.

As shown in FIG. 5, 11 bits RM-encoder may be shown by blocks $210_0$-$210_{10}$, which indicated a coding format for a bit sequence of the feedback information to be generated by the terminal device 120. A bit sequence 510 is generated for HARQ ACK/NACK feedback. The first reception states (block $220_0$-$220_3$) may be encoded in the bit sequence 510 from the beginning of the bit sequence 510 to the end of the bit sequence 510. The second reception states (block $230_0$-$230_2$) may be encoded in the bit sequence 510 from the end of the bit sequence 510 to the beginning of the bit sequence 510. The bit sequence 510 may reflect the case that the last channel in the first group is missed. The bit sequence 520 may reflect the case that the last channel in the second group is missed.

The above-mentioned embodiment may be adopted at most 2 PDSCH groups in one PUCCH. Comparing with the embodiment with additional bits, the above-mentioned embodiment may save bits. In this way, the miss-detection of the last PDCCH of either first group or second group can be treated as NACK at the network device under such encoding method.

The polar encoder may also be used for this embodiment. The difference between RM encoder is that the length of total bit length for mapping of encoder is total bit length indicated by PUSCH grant for transmission on PUSCH or the sum of bit length of two PDSCH group indicated by DAI for transmission on PUCCH. For polar coding on PUSCH, miss detection of the last PDCCH can be solved by the network device by detecting NACK at corresponding position in HARQ-ACK bit sequence.

For polar coding on PUCCH, miss-detection of the last PDCCH can be solved by the network device by blind decoding of the length of polar coding. Only last PDSCH for each group could be under influence and gNB can ignore the corresponding bit simply. For polar encoder, adding some '0' bits in the front of bits sequence to encoder may lead to the same encoded bits, which is harmful for blind decoding. The same as DCI CRC generation for blind decoding, '1' bits of length L are added in the front of bits sequence to generate CRC bits and are removed for the final bits sequence after CRC.

In some example embodiments, in addition to the first channel indices and the second channel indices, the terminal device 120 may receive other information in the DCI. For example, third channel indices of the channels in the first group of data channels and the second group of data channels cross the first set of data channel and the second set of data channel. The terminal device 120 may generate a bit sequence based on the first channel indices, the second channel indices and the third channel indices.

Examples may be shown in the Tables as below:
TABLEs 1-2: Examples of channel indices cross the first set of data channel and the second set of data channel The terminal device 120 may receive indication of the T-DAI in the tables in DCI and determine the HARQ ACK/NACK feedback bit ordering in the bit sequence for feedback based on the T-DAI. For example, the $3^{rd}$ PDSCH of the first group of data channels may be transmitted in the $7^{th}$ slot. In a nature ordering, the $3^{rd}$ PDSCH may occupy the $3^{rd}$ bit in a HARQ ACK/NACK bit sequence. However, in view of the channels cross the first and the second group of data channels, the $3^{rd}$ PDSCH in the first group is the $5^{th}$ PDSCH in the channels cross the first and the second group of data channels. The encoding ordering of this PDSCH may be changed according to the T-DAI.

As mentioned above, the T-DAI are accumulated across all PDSCH groups, which may reuses the bit field in DCI and T-DAI is similar to C-DAI except C-DAI is within each PDSCH group. The PUCCH HARQ-ACK bits ordering are based on accumulated T-DAI. For one HARQ-ACK bit by T-DAI, if the corresponding PDSCH group is received indicated by the network device (bit toggled), it doesn't count.

Referring back to FIG. 3, at block 330, the terminal device 120 may transmit the feedback information via an uplink channel to the network device 110.

Figure 6:
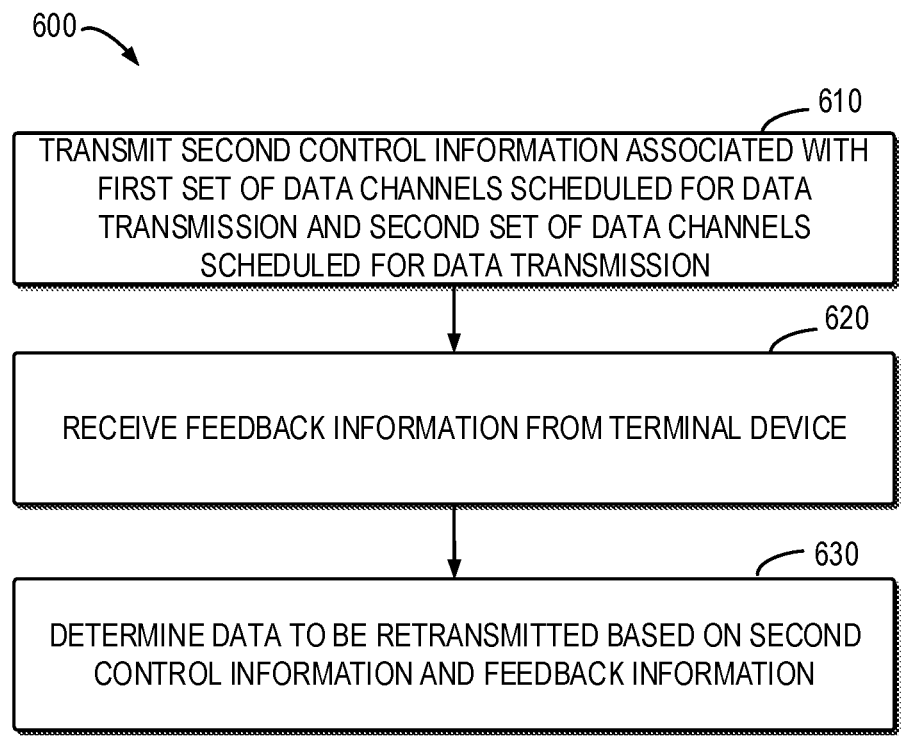
FIG. 6 illustrates a flowchart of an example method in accordance with some embodiments of the present disclosure.

FIG. 6 illustrates a flowchart of an example method 600 in accordance with some embodiments of the present disclosure. The method 600 can be implemented at the network device 110 shown in FIG. 1. It is to be understood that the method 600 may include additional blocks not shown and/or may omit some blocks as shown, and the scope of the present disclosure is not limited in this regard. For the purpose of discussion, the method 600 will be described with reference to FIG. 1.

At block 610, the network device 110 may schedule a first set of data channels and a second set of data channels for the data transmission from the network device to the terminal

| slot | 0 | 1 | 2 | 3 | 4 | 5 | 6 | 7 | 8 | 9 | 10 |
|---|---|---|---|---|---|---|---|---|---|---|---|
| Group ID | 0 | 0 | 1 | PUCCH | 1 | 0 | PUCCH | 0 | 1 | | PUCCH |
| RI | 0, 0 | 0, 0 | 0, 0 | feedback | 0, 0 | 0, 0 | feedback of | 0, 0 | 0, 1 | | feedback |
| C-DAI | 0 | 1 | 0 | of slot | 1 | 2 | slot 2, 4 | 3 | 2 | | of slot |
| order1 | A(0) | A(1) | | 0, 1 | | A(2) | | A(3) | B(0) | | 5, 7, 8 + |
| T-DAI | 0 | 1 | 2 | | 3 | 4 | | 5 | 6 | | 0, 1(re) |
| order2 | C(0) | C(1) | | | | C(2) | | C(3) | C(4) | | |

| slot | 0 | 1 | 2 | 3 | 4 | 5 | 6 | 7 | 8 | 9 | 10 |
|---|---|---|---|---|---|---|---|---|---|---|---|
| group ID | 0 | 0 | 1 | PUCCH | 1 | 0 | PUCCH | 0 | 1 | | PUCCH |
| RI | 0, 0 | 0, 0 | 0, 0 | feedback | 0, 0 | 0, 0 | feedback of | 0, 0 | 0, 0 | | feedback |
| C-DAI | 0 | 1 | 0 | of slot 0, 1 | 1 | 2 | slot 2, 4 | 3 | 2 | | of slot |
| order1 | A(0) | A(1) | B(0) | | B(1) | A(2) | | A(3) | B(2) | | 5, 7, 8 + |
| T-DAI | 0 | 1 | 2 | | 3 | 4 | | 5 | 6 | | 0, 1(re) |
| order2 | C(0) | C(1) | C(2) | | C(3) | C(4) | | C(5) | C(6) | | |

Tables 1 and 2 show slots 0-11, respectively. For each data channels in the first and the second group of data channels, two indices may be used. The C-DAI in the tables may indicate the index of a channel within a data channel group and the T-DAI in the tables may indicate the index of a channel cross two data channel groups. In the $3^{rd}$, $6^{th}$ and $10^{th}$ slot, the HARQ ACK/NACK feedback may be reported via a PUCCH.

device and transmits the second control information associated with the first and second set of data channels.

At block 620, the network device 110 may receive feedback information indicating first reception states of data on a first group of data channels in association with a first channel indices for the first group of data channels and second reception states of data on a second group of data channels in association with a second channel indices for the second group of data channels. As explained with reference to FIG. 3, the first group of the data channels may be at least part of a first set of data channels and the second group of the data channels may be at least part of a second set of data channels.

At block 630, the network device 110 may determine data to be retransmitted based on the second control information and the feedback information.

As mentioned above, the bit sequence for HARQ request may be generated according to various schemes. The corresponding encoding order may be preconfigured for both of the encoding processing in the terminal device side and decoding processing in the network device side. Thus, the network device may be aware of the miss detection of the DCI in multiple PDSCH group based on the feedback information.

In this way, for the case that the HARQ ACK/NACK feedback related to multiple PDSCH groups in a same PUCCH, the miss detection of DCI in multiple PDSCH groups may reflect in the bit sequence for the HARQ ACK/NACK feedback, so that the network device may be aware of the miss detection and determine the data to be retransmitted.

As described above, the solutions for handle more than one PDSCH group have been discussed. However, for one PDSCH group, there are also some ambiguous issues, and we can use T-DAI which are functional equivalent to C-DAI for single carrier to solve it.

Single cell T-DAI in NR-U is like C-DAI in Rel-15 NR, that it isn't accumulated within group, i.e. reset to initial value for a new PUCCH occasion in a group.

If there is no such T-DAI, the miss detection of the last PDCCH of previous PUCCH occasion and miss detection of the first PDCCH of current PUCCH occasion for discontinuous C-DAI of a group in some cases may not be distinguished.

An example of the T-DAI for one PDSCH group may be shown in the following table.

TABLE 3

An example of channel indices cross the first set of data channel and the second set of data channel

| | slot | 0 | 1 | 2 | 3 | 4 | 5 | 6 | 7 | 8 | 9 | 10 | 11 |
|---|---|---|---|---|---|---|---|---|---|---|---|---|---|
| | group ID | 0 | 0 | 0 | 0 | | PUCCH | 0 | 0 | 0 | | | PUCCH |
| Case 1 | RI | 0 | 0 | 0 | 0 | | feedback | | 1 | 1 | | | feedback |
| | C-DAI | 0 | 1 | 2 | 3 | | | | 4 | 5 | | | |
| | T-DAI | 0 | 1 | 2 | 3 | | | | 0 | 1 | | | |
| Case 2 | RI | 0 | 0 | 0 | | | | | 1 | 1 | 1 | | |
| | C-DAI | 0 | 1 | 2 | | | | | 3 | 4 | 5 | | |
| | T-DAI | 0 | 1 | 2 | | | | | 0 | 1 | 2 | | |

For example, in case 1 the PDCCH of slot 3 is missed and in case 2 the PDCCH of slot 7 is missed, from the terminal device side, it is hard to decide where the missing C-DAI 3 is, different cases lead to different bit length (2 bits for case 1 and 3 bits for case 2), and HARQ-ACK bit will shift if misalignment. With the help of single cell T-DAI, UE can decide the case, i.e. the terminal device can determine case 1 or case 2 with the T-DAI field in slot 8.

In some example embodiments, when HARQ-ACK is transmitted on PUSCH, the total number of bits is indicated by PUSCH grant DCI (Rel-15 NR). The embodiments explained with reference to FIGS. 4 and 5 can be introduced for HARQ-ACK transmission on PUSCH. For example, the total encoded bit length is the length indicated by DAI in PUSCH grant plus the information bit length of previous PDSCH groups. For more PDSCH groups in one PUCCH meanwhile PUSCH is transmitted for HARQ-ACK feedback, more total DAI field in PUSCH uplink grant DCI (DCI format 0-0 or 0-1) corresponding to each PDSCH group can be adopted to solve the ambiguous of miss detection of the last PDCCH of which PDSCH groups.

Although most of the solutions in the present disclosure are proposed to intends to handle more than one PDSCH group. In some example embodiments, it may be considered applying some restriction for the configuration of downlink transmission. For example, the number of PDSCH groups in the same PUCCH can be configurable. For single cell operation, the terminal device does not expect to configure more than one PDSCH groups in the same PUCCH. For example, RRC may have parameter maxPdschGroupsNum and servingCellNum. If servingCellNum>1, maxPdschGroupsNum={1, 2}, else (servingCellNum==1) maxPdschGroupsNum={1}. The terminal device does not expect to transmit the HARQ feedback of more than one PDSCH groups in the same PUSCH when PUSCH and PUCCHs for feedback are overlapping at a slot and condition of HARQ-ACK feedback on PUSCH is satisfied.

Figure 7:
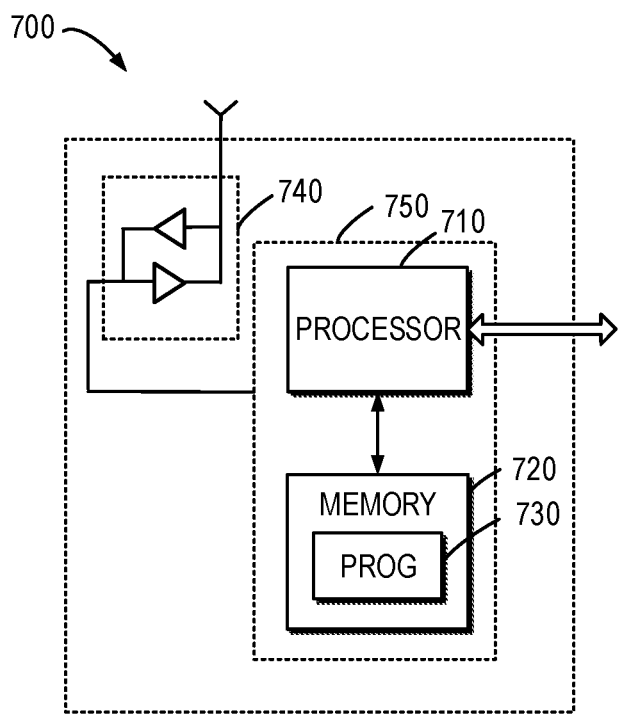
FIG. 7 is a simplified block diagram of a device that is suitable for implementing embodiments of the present disclosure.

FIG. 7 is a simplified block diagram of a device 700 that is suitable for implementing embodiments of the present disclosure. The device 700 can be considered as a further example implementation of the network device 110 or the terminal device 120 as shown in FIG. 1. Accordingly, the device 700 can be implemented at or as at least a part of the network device 110 or the terminal device 120.

As shown, the device 700 includes a processor 710, a memory 720 coupled to the processor 710, a suitable transmitter (TX) and receiver (RX) 740 coupled to the processor 710, and a communication interface coupled to the TX/RX 740. The memory 710 stores at least a part of a program 730. The TX/RX 740 is for bidirectional communications. The TX/RX 740 has at least one antenna to facilitate communication, though in practice an Access Node mentioned in this application may have several ones. The communication interface may represent any interface that is necessary for communication with other network elements, such as X2 interface for bidirectional communications between eNBs, S1 interface for communication between a Mobility Management Entity (MME)/Serving Gateway (S-GW) and the eNB, Un interface for communication between the eNB and a relay node (RN), or Uu interface for communication between the eNB and a terminal device.

The program 730 is assumed to include program instructions that, when executed by the associated processor 710, enable the device 700 to operate in accordance with the embodiments of the present disclosure, as discussed herein with reference to FIGS. 2-6. The embodiments herein may be implemented by computer software executable by the processor 710 of the device 700, or by hardware, or by a combination of software and hardware. The processor 710 may be configured to implement various embodiments of the present disclosure. Furthermore, a combination of the processor 710 and memory 710 may form processing means 750 adapted to implement various embodiments of the present disclosure.

The memory 710 may be of any type suitable to the local technical network and may be implemented using any suitable data storage technology, such as a non-transitory computer readable storage medium, semiconductor-based memory devices, magnetic memory devices and systems, optical memory devices and systems, fixed memory and removable memory, as non-limiting examples. While only one memory 710 is shown in the device 700, there may be several physically distinct memory modules in the device 700. The processor 710 may be of any type suitable to the local technical network, and may include one or more of general purpose computers, special purpose computers, microprocessors, digital signal processors (DSPs) and processors based on multicore processor architecture, as non-limiting examples. The device 700 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to FIG. 2. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method performed by a terminal device, the method comprising:
   receiving downlink control information (DCI) for scheduling physical uplink shared channel (PUSCH), wherein the DCI comprises a total downlink assignment index (DAI) (T-DAI) field for a first group of Physical Downlink Shared Channels (PDSCHs) and a second group of PDSCHs, wherein bits for the T-DAI field in the DCI comprise first bits for the first group of PDSCHs and second bits for the second group of PDSCHs; and
   transmitting hybrid automatic repeat request (HARQ)-acknowledgement (ACK) information on the PUSCH.

2. A method performed by a network device, the method comprising:
   transmitting downlink control information (DCI) for scheduling a physical uplink shared channel (PUSCH), wherein the DCI comprises a total downlink assignment index (T-DAI) field for a first group of Physical Downlink Shared Channels (PDSCHs) and a second group of PDSCHs, wherein bits for the T-DAI field in the DCI comprise first bits for the first group of PDSCHs and second bits for the second group of PDSCHs; and receiving hybrid automatic repeat request (HARQ)-acknowledgement (ACK) information on the PUSCH.

3. A terminal device, comprising:
a processor configured to cause the terminal device to:
receive downlink control information (DCI) for scheduling a physical uplink shared channel (PUSCH), wherein the DCI comprises a total downlink assignment index (T-DAI) field for a first group of Physical Downlink Shared Channels (PDSCHs) and a second group of PDSCHs, wherein bits for the T-DAI field in the DCI comprise first bits for the first group of PDSCHs and second bits for the second group of PDSCHs; and
transmit hybrid automatic repeat request (HARQ)-acknowledgement (ACK) information on the PUSCH.

* * * * *